United States Patent [19]

Kurata et al.

[11] Patent Number: 4,510,523
[45] Date of Patent: Apr. 9, 1985

[54] TWO-COLOR COPYING MACHINE

[75] Inventors: Masami Kurata; Toshiharu Inui; Takashi Ohmori, all of Kanagawa, Japan

[73] Assignee: Fuji Xerox Co., Ltd., Tokyo, Japan

[21] Appl. No.: 334,199

[22] Filed: Dec. 24, 1981

[30] Foreign Application Priority Data

Dec. 26, 1980 [JP] Japan ................. 55-183840

[51] Int. Cl.³ .............................. H04N 1/46
[52] U.S. Cl. ........................ 358/75; 358/77
[58] Field of Search ............. 358/75, 280, 76, 287, 358/77, 80; 355/18, 19, 51, 55; 346/76 R, 76 PH, 45, 46

[56] References Cited

U.S. PATENT DOCUMENTS

| | | | |
|---|---|---|---|
| 3,745,235 | 7/1973 | Bestenreiner | 358/75 |
| 3,977,781 | 8/1976 | Eppe | 355/18 |
| 4,071,849 | 1/1978 | Koyano | 346/76 PH |
| 4,168,421 | 9/1979 | Ito | 346/76 PH |
| 4,229,098 | 10/1980 | Schmoker | 355/18 |
| 4,303,936 | 12/1981 | Shaw | 358/75 |
| 4,323,919 | 4/1982 | Fujii | 358/75 |
| 4,335,968 | 6/1982 | Regnault | 358/78 |
| 4,378,566 | 3/1983 | Tsukamura | 358/75 |

FOREIGN PATENT DOCUMENTS 122276 9/1981 Japan ..................... 358/75

Primary Examiner—Tommy P. Chin
Attorney, Agent, or Firm—Sughrue, Mion, Zinn, Macpeak & Seas

[57] ABSTRACT

A two-color copying machine includes a scanner unit for producing output signals representing different colors of an original image and a thermal printer heating its heating elements to temperature ranges in accordance with the scanner unit output signals and utilizing a recording medium which records in two different colors depending on the applied temperature.

18 Claims, 4 Drawing Figures

TWO-COLOR COPYING MACHINE

BACKGROUND OF THE INVENTION

This invention relates to a two-color copying machine which carries out a two-color heat-sensitive recording operation based on the principle that a recording sheet has different coloring temperatures.

A two-color copying machine for recording an image in two colors, e.g. black and red, according to an electrostatic photographic technique is known in the art. In such a conventional two-color copying machine, two electrostatic recording drums or sheet members are used, and electrostatic latent images are formed thereon respectively. The latent images thus formed are then developed with the black and red toners, respectively. The two toner images thus obtained are transferred onto the recording sheet in such a manner that they are not displaced relative to each other. The toner images are then thermally fixed, to obtain the desired image on the recording sheet. This conventional two-color copying machine can make a number of copies of an original by repeatedly exposing the original to light; however, it is disadvantageous in that it consumes a large electric power in order to fix the toner images on the recording sheet. Furthermore, since an extremely large amount of heat is generated by the fixing unit, it is necessary to provide a heat insulation mechanism in order to protect other circuits and components from the heat, which increases the size of the copying machine and the manufacturing cost. For these reasons, the conventional two-color copying machine is disadvantageous.

SUMMARY OF THE INVENTION

In view of the foregoing, an object of this invention is to provide a two-color copying machine which can make a number of copies of an original, and which is low in power consumption, small in size and low in manufacturing cost.

The foregoing object of the invention is achieved according to the present invention by the provision of a two-color copying machine which comprises: an image reading section in which a platen on which an original is placed is fixed, while a scanner unit for reading the image data of the original is moved in the auxiliary scanning direction in reading the image data, or vice versa, so as to provide video signals; and a two-color recording section which uses a heat-sensitive recording sheet having two different coloring temperatures and which colors in two different tones at the two respective coloring temperatures.

The scanner provides two different signals which can then be used to derive the eventual black and red image signals. These signals are then supplied through respective recording signal composing circuits wherein a particular signal intensity is generated for the red signals and a different signal intensity for the black, except when an "all black" mode is selected in which case both red and black signals are generated with signal intensities in the black recording range.

BRIEF DESCRIPTION OF THE DRAWINGS

This invention will be described with reference to its preferred embodiments as shown in the accompanying drawings, in which.

DETAILED DESCRIPTION OF THE INVENTION

Figure 1:
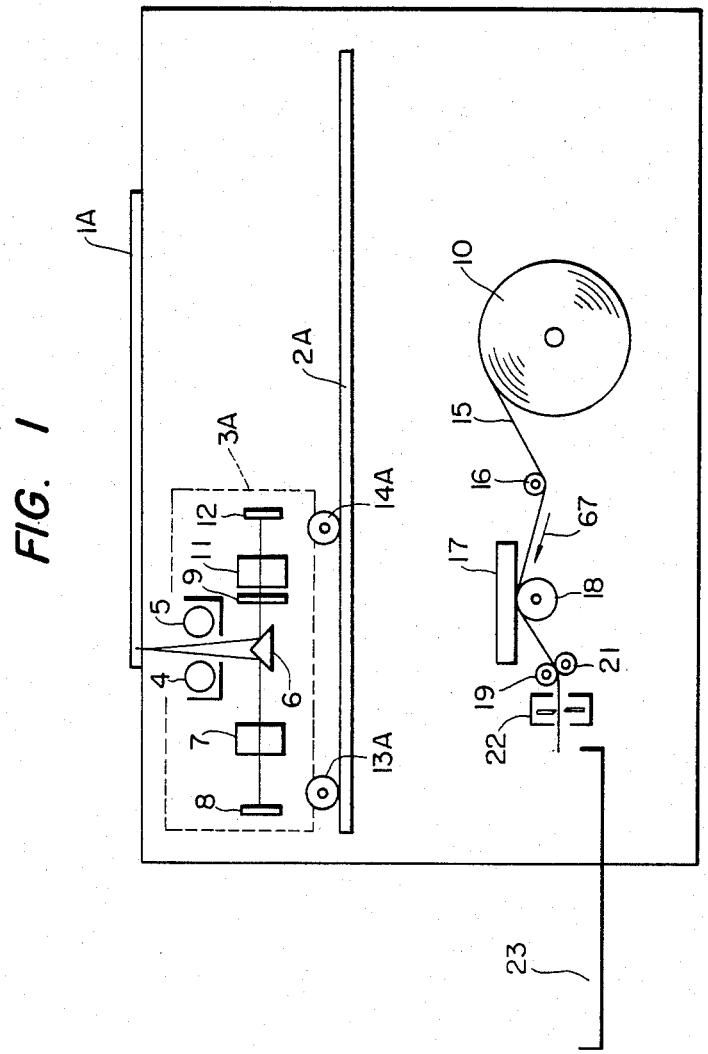
FIG. 1 is an explanatory diagram showing the arrangement of a two-color copying machine according to one embodiment of the invention.

FIG. 1 is a schematic diagram showing the arrangement of a two-color copying machine according to one embodiment of the invention. The two-color copying machine comprises an image reading section for reading the image data of an original and a two-color recording section for providing a two-color recorded image according the image data of an original.

The image reading section is made up of a stationary platen 1A on which an original is placed, and a scanner unit 3A which is reciprocated on a rail 2A set in parallel with the platen 1A. In the scanner unit 3A, a pair of fluorescent lamps 4 and 5 are set in a direction perpendicular to the direction of movement of the scanner unit 3A (hereinafter referred to as "a main scanning direction", when applicable) with a predetermined distance therebetween. Each of the fluorescent lamps is slightly longer than the width of the platen 1A. A reflecting mirror 6 is set below the fluorescent lamps 4 and 5, in order to cause light reflected from the surface of an original to advance in two directions. In one of the two directions, i.e., in one optical path of a light beam reflected by the reflecting mirror 6, are provided a lens 7 for forming an optical image and an image sensor 8 for converting the optical image into an electrical signal. In this copying machine, the image sensor 8 is to read black image data.

In the other direction, i.e., in the other optical path of the light beam reflected by the reflecting mirror 6, are provided a cyan filter 9 for absorbing red rays, a lens 11 for focusing rays passed through the filter 9, and an image sensor 12 for converting an optical image into an electrical signal. In this embodiment, the image sensor 12 is to read black and red image data.

The scanner unit 3A further incorporates a circuit for processing image signals outputted by the image sensors 8 and 12 (which will be described later). The scanner unit 3A can be freely reciprocated on the rail 2A by means of rolls 13A and 14A which are driven by a motor (described later).

On the other hand, the two-color recording section is provided with a sheet supply roll 10 for supplying a heat-sensitive recording sheet 15. The heat-sensitive recording sheet 15 fed from the sheet supply roll 10 is heated when passed between a thermal head 17 and back roll 18 via a guide roll 16, so that a tone is recorded thereon in accordance with the heating temperature. The recording sheet 15 is then delivered to an automatic cutter 22 by a pair of rolls 19 and 21 which are disposed downstream of the thermal head and is cut to a predetermined size. The recording sheet 15 thus cut is received by a sheet discharging tray 23.

Figure 2:
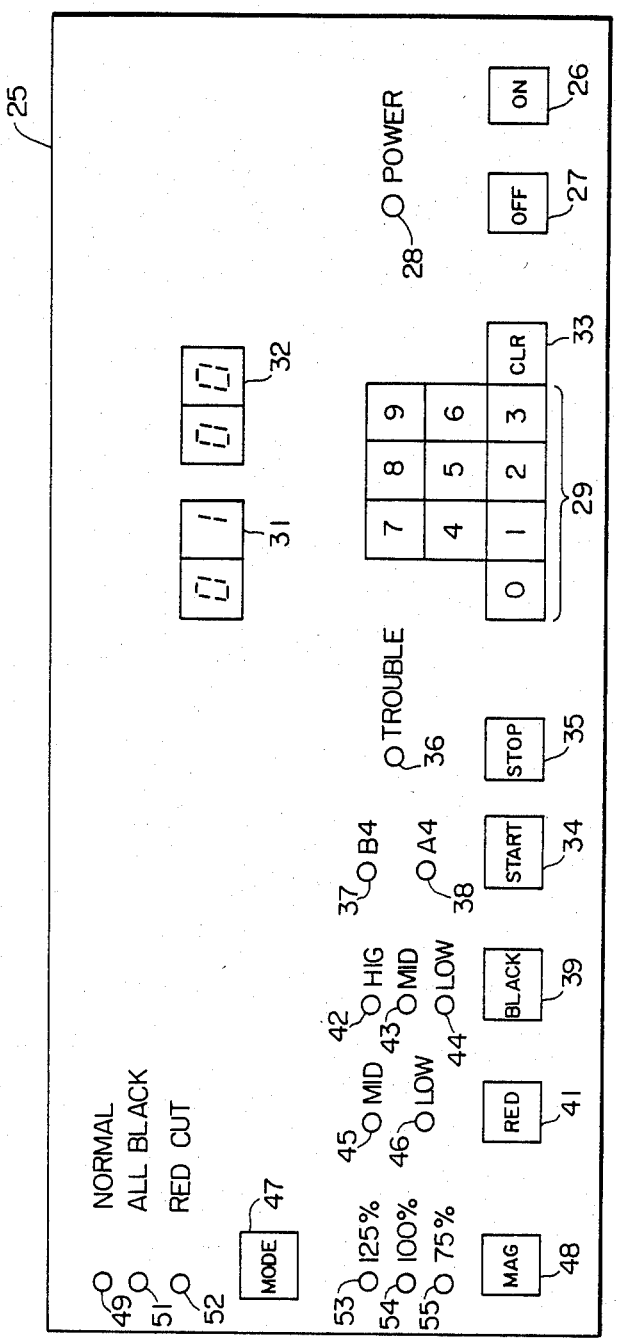
FIG. 2 is an explanatory diagram showing an operating panel employed in the copying machine in FIG. 1.

FIG. 2 shows the operating panel of the two-color copying machine. A number of switches, indicators and two counters are arranged on the operating panel 25. A power-on switch 26 and a power-off switch 27 are used to turn on and off a power supply. When the power-on switch 26 is operated, a power indicator 28 is turned on to inform the operator of the fact that the copying machine is operative, in combination with the displays of other indicators. A ten-key keyboard 29 is used to set the number of sheets of copies. A numerical value set by the keyboard 29 is displayed on a set counter 31. The number of sheets of copies displayed on the set counter 31 can be changed by inputting the number of sheets of copies with the keyboard 29 again after operating a clear button 33. However, it should be noted that, when the keyboard 29 is operated again five seconds after the number of sheets of copies has been set in the set counter 31, the new number of sheets of copies can be set in the set counter 31 without depressing the clear button 33.

A start switch 34 and a stop switch 35 are arranged substantially at the central portion of the operating panel 25. The start switch 34 is used to start a copying operation, and the stop switch 35 is to stop the operation of the copying machine. When a heat-sensitive recording sheet is caught in the copying machine or some other serious trouble occurs, the operation of the copying machine is stopped without depressing the stop switch 35. In this case, a trouble indicator 36 flickers to inform the operator of the occurrence of trouble. The trouble indicator 36 flickers continuously until the operator depresses the clear button 33 after eliminating the trouble. While the indicator 36 flickers, the copying machine cannot be started again even if the start switch 34 is depressed.

A size "B4" indicator 37 and a size "A4" indicator 38 are arranged above the start switch 34. The copying machine discriminates the width of a heat-sensitive recording sheet with the aid of a recording sheet size switch (described later), and allows the indicator 37 or 38 to turn on depending on whether the size of the heat-sensitive recording sheet set in the copying machine is "B4" or "A4". Furthermore, the scanning length of the scanner unit and the recording width of the thermal head are automatically set, to reduce the power consumption and to prevent the deterioration of the roll in the two-color recording section which is caused by the printing of unnecessary regions.

A black density change-over switch 39 and a red density change-over switch 40 are arranged on the left-hand side of the start switch 34. These switches are used to finely change the amount of heat generated by the thermal head, to thereby set several different recording densities of black and red. When the black density change-over switch 39 is depressed, an indicator 42 indicating "a high density" is turned on. When the switch 39 is thereafter depressed, an indicator 43 indicating "a middle density" is turned on. When the switch 39 is subsequently depressed, an indicator 44 indicating "a low density" is turned on. That is, as the switch 39 is depressed successively, the indicators 42, 43 and 44 are successively turned on in the desired order, so that the black recording densities are set and displayed. Similarly, as the red density change-over switch 41 is depressed successively, an indicator 45 indicating "a middle density" and an indicator 46 indicating "a low density" are turned on in the stated order, so that the red recording densities are set and displayed.

A mode selecting button 47 and a magnification setting button 48 are arranged along the left end of the operating panel 25. The mode selecting button is a switch for selecting a recording color. As the mode selecting button 47 is depressed successively, three color modes are selected successively. When a "normal" mode is selected, a "normal" specifying indicator 49 is turned on. In this color mode, red image data are recorded in red, and black image data are recorded in black. When an "all black" mode is selected, an "all black" specifying indicator 51 is turned on. In this color mode, red image data and black image data are all recorded in black. When a "red cut" mode is selected, a "red cut" specifying indicator 52 is turned on. In this color mode, black image data are recorded in black, but red image data are not recorded.

The magnification setting button 48 is a switch for setting a copying magnification. Whenever the button 48 is depressed, a different copying magnification is selected. That is, copying magnifications of 125%, 100% and 75% are set one after another and are displayed on indicators 53, 54 and 55, respectively.

The operator of the copying machine places an original on the platen 1A (FIG. 1) and depresses the power-on switch 26 on the operating panel 25, as a result of which the power indicator 28 is turned on and the copying machine is activated.

Figure 3:
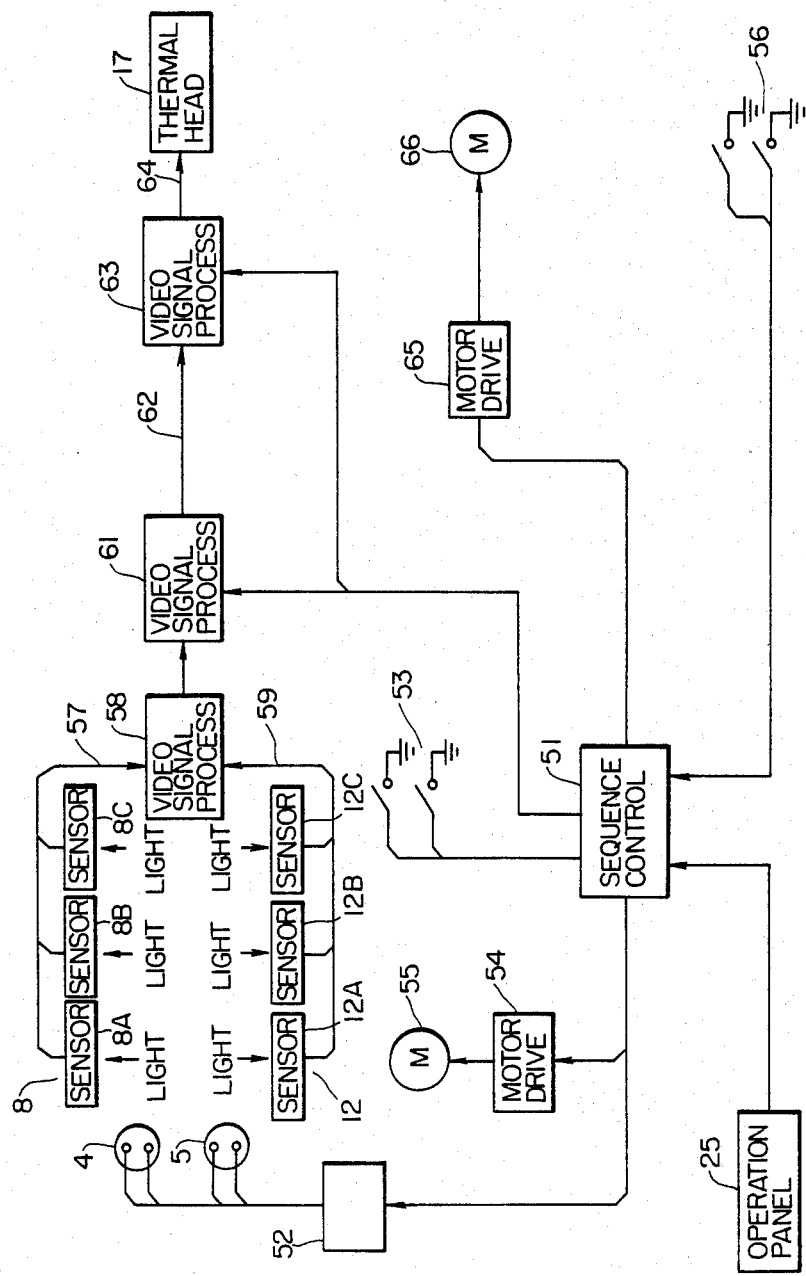
FIG. 3 is a block diagram showing an electrical circuit of the copying machine in FIG. 1.

FIG. 3 shows an electrical circuit of the copying machine. Upon depression of the start button 34 on the operating panel 25, a sequence control section 51 decides whether or not the copying machine is operable. When the copying machine is in a normal state, i.e., it is ready for the starting of recording, the sequence control section 51 supplies current to a high frequency ballast 52 to turn on the 15 W fluorescent lamps 4 and 5. At the same time, the sequence control section 51 determines whether or not the scanner unit 3A is at the start position from position data which is supplied by a scanner position switch 53. The scanner position switch 53 is provided, for instance, near the end of the rail 2A (FIG. 1). If the scanner unit 3A is not at the start position, the sequence control section 51 supplies current to a motor drive circuit 54, so that the scanner unit 3A is set at the home position by a scanner motor 55. If the scanner unit 3A is not set at the home position within a predetermined period of time, the sequence control section 51 determines that trouble has occurred in the copying machine, and it stops the operation of the copying machine and allows the trouble indicator 36 to flicker.

When the scanner position switch 53 detects that the scanner unit 3A is set at the home position within the predetermined period of time, the sequence control section 51 controls the motor drive circuit 54 to turn the scanner motor 55 in a forward or reverse direction, to reciprocate the scanner unit 3A. In the case where the value "1" is set in the set counter 31 (FIG. 2), i.e., in the case of a one-sheet copying operation, the sequence control section 51 controls the scanner motor 55 so that the scanner unit 3A is subsequently returned to the home position quickly. On the other hand, if a number of copies are to be printed, image data are read not only when the scanner unit 3A travels forward but also when it returns, and therefore the scanner unit 3A moves forward and backward at the same speed. The sequence control section 51 determines the movement distance, in the auxiliary scanning direction, of the scanner unit 3A from size data provided by a recording sheet size switch 56, position data provided by the scanner position switch 53 and a copying magnification selected with the operating panel 25.

When the scanner unit 3A starts forward or backward movement, the image sensors 8 and 12 convert the optical image into electrical signals for each line. The image sensor 8 may comprise three photo-diode arrays 8A, 8B and 8C each having 1024 photo-electric conversion elements arranged in one line. Similarly, the image sensor 12 may comprise three photo-diode arrays 12A, 12B and 12C each having 1024 photo-electric conversion elements arranged in one line. The image sensors 8 and 12 can read with a resolution of 12 dots/mm image data for one line on a size "B4" original having a width of 256 mm. CCDs (charge-coupled devices) or other image pickup elements may be employed as the image sensors 8 and 12.

The image sensor 8 operates to convert light reflected from the original directly into an electrical signal, and supplies a video signal 57 to a first video signal processing circuit 58 in response to a clock pulse signal which is provided by a clock pulse generator (not shown). The video signal represents black image data which is discriminated in accordance with luminosity. Light reflected from the original is passed through the cyan filter 9 (FIG. 1) and is then applied to the image sensor 12, where it is converted into an electrical signal. The image sensor 12 supplies a video signal 59 to the first video signal processing circuit 58 in response to the aforementioned clock pulse signal. This video signal is representative of black and red image data which have been read equally as black image data.

In the first video signal processing circuit 58, these video signals 57 and 59 are formed into two different time-series signals. These time-series signals are processed into time-series signals corresponding to an optical image which has passed through the red filter. As a result, three different video signals: a white signal corresponding to the luminosity of the original, a cyan signal obtained through the cyan filter, and a red signal equivalent to that which has passed through a red filter, are provided. The first video signal processing circuit 58 applies the three video signals to an automatic background control circuit, to perform background correction, and thereby eliminate the noise (background) of the video signals in a known manner. The video signals are then applied to a digital encoder circuit, where they are converted into digital signals. Thus, three stable digital video signals from which the effect of light quantity variation has been removed, can be obtained. The first video signal processing circuit 58 may also have a white line skip function such that, when the next line to be read is all white (background color), reading of the line is skipped. If the first video signal processing circuit has this function, it is preferable that the image sensors 8 and 12 are made up of image pickup elements which can read two adjacent lines simultaneously. Except for the receipt of two signals instead of one and the generation of three separate video signals from the original two, which may be accomplished by straightforward signal correllation, the first signal processor circuit 58 may be substantially similar to the picture signal processing circuit disclosed in copending and commonly assigned application Ser. No. 329,468 filed on Dec. 10, 1981.

The digital signals outputted by the first video data signal processing circuit 58 are applied to a second video data signal processing circuit 61. This circuit 61 first forms red and black video signals through processing with the aid of the white, cyan and red digital video signals. These two video signals are subjected to line density conversion. The term "line density conversion" is intended to mean the operation in which a video signal of a line density of 12 dots/mm read by each of the image sensor 8 and 12 is converted according to a magnification which is selected by operating the magnification setting button 48 (FIG. 2). For instance, with a magnification 100% (life size), 12 dots/mm is converted into 8 dots/mm; with a magnification 75% (contraction to ¾), 12 dots/mm is converted into 6 dots/mm; with a magnification 125% (enlargement to 5/4), 12 dots/mm is converted into 10 dots/mm. The serial digital video signals 62 which are obtained through the conversion are applied to a third video signal processing circuit 63 under control of the sequence control section 51. With the exception of the generation of black and red signals from the white, cyan and red filter signals which again may be simple signal correllation, the second signal processor 61 may may be substantially similar to the line density conversion circuit disclosed in said copending application Ser. No. 329,468.

The serial digital video signals 62 can also be applied, as serial signals, to an external receiver such as a facsimile receiver. Therefore, external transmission terminals for outputting the serial digital video signals 62 may be provided in the copying machine so that they are connected through a modem to telephone lines, private communication lines, wireless lines or the like.

In the third video signal processing circuit 63, two serial digital video signals 62 concerning black and red are written in a memory once, and are then read in the forward direction or in the reverse direction in accordance with the scanning direction of the scanner unit 3A (FIG. 1). As was described before, when a plurality of copies are printed, the scanner unit 3A reads video signals not only when it moves forward but also when it moves backward. Therefore, if it is assumed that the reading order is correct when the scanner moves unit forward, then the reading order is reversed when it moves backward. Thus, if the video signals were not rearranged, then the recorded images would become mirror images. Therefore, if the video signals are read out of the memory in a first direction when the scanner moves forward, then the video signals are read out in the reverse direction when it moves backward. However, such video signal rearrangement is unnecessary in the case where only one copy of an original is made or video signals are received through external signal receiving terminals. Except for the operation on two signals instead of one, the data rearrangement may be performed in the same manner as in said copending application Ser. No. 329,468.

The serial digital video signals of black and red read out of the memory are subjected to series-parallel conversion so as to be supplied to the thermal head 17. As a result, parallel video signals for one line of heat generating elements or to one block of elements which are to be driven at any are time, are successively formed. These parallel video signals are supplied to the head 17 through a recording width control circuit contained in the processor 63, where video signals for other than the portion of the heat-sensitive recording sheet 15 (FIG. 1) which is brought into contact with the thermal head 17 are cut off. For this purpose, the sequence control section 51 delivers to the third video signal processing circuit 63 the size data which is supplied by the recording sheet size switch 56. The recording width is limited according to the size of a heat-sensitive recording sheet, in order to reduce the power consumption.

The parallel video signals of black and red passed through the recording width control circuit are then supplied to a signal composing circuit. In the signal composing circuit, two different temperatures are set in the red coloring temperature range of the heat-sensitive recording sheet 15, and three different temperatures are set in the black coloring temperature range which is higher than the red coloring temperature range. Of the five different temperatures, two are selected in correspondence to the black and red recording densities which are specified by operating the operating panel 25 (FIG. 2). The peak value (or pulse width) of a video signal 64 applied to the thermal head 17 for a particular recording color is controlled in two steps. The recording color is selected by operating the mode selecting button 47 (FIG. 2). Therefore, if the "all black" mode is selected by the mode selecting button 47, the signal composing circuit selects one of the five different temperatures, and outputs a video signal 64 having a peak value corresponding to the temperature thus selected to the thermal head 17.

In response to the output video signal 64 of the third video signal processing circuit 63, the thermal head 17 generates heat in one or two steps, to record the image data in two colors (black and red) or in one color (black) for each line.

In synchronization with the start of the recording operation of the thermal head 17, the sequence control section 51 supplies current to a motor drive circuit 65 for conveying the heat-sensitive recording sheet, whereupon the latter 65 supplies a pulse signal to a step motor 66 to drive the latter 66. As a result, the back roll 18 and one pair of feed rolls 19 and 21 are driven, to move the heat-sensitive recording sheet 15 in the direction of the arrow 67 (FIG. 1). At the same time, the heat-sensitive recording sheet 15 is heated selectively by the thermal head 17 while being pressed by the back roll 18.

The heat-sensitive recording sheet 15 is prepared by forming a black coloring layer which colors at high temperature, a color eliminating layer which contains a color eliminating agent, and a red coloring layer which color at low temperature on a support in the stated order. The color eliminating layer is to prevent, when black coloring is effected at high temperature, the mixing of red from the red coloring layer which colors at low temperature. Thus, the color eliminating layer is most effective when the black recording density is set relatively low. By way of example, the contents of these layers are as described below:

Black coloring layer

The following dispersing solutions (A) and (B) are thoroughly mixed, and the resulting mixture is coated on a support.

|  | Parts by weight |
|---|---|
| (a) Dispersing solution (A) | |
| 2-{N—(3'-trifluoromethylphenyl)-amino}-6-diethylaminofluoran | 4.2 |
| Polyvinyl alcohol (10% aqueous solution) | 2.0 |
| Water | 25.8 |
| (b) Dispersing solution (B) | |
| Bisphenol A | 16.0 |
| Polyvinyl alcohol (10% aqueous solution) | 20.0 |
| Water | 14.0 |

Color eliminating layer

The black coloring layer is coated with the following color eliminating layer components, after being dried:

| Components | Parts by weight |
|---|---|
| Ethylene oxide (6.0 mol) and propylene oxide (4.5 mol) adduct of bisphenol A | 6.0 |
| Polyvinyl alcohol (15% aqueous solution) | 30.0 |
| Water | 64.0 |

Red coloring layer

The following dispersing solutions (C) and (D) are thoroughly mixed, and the resulting mixture is coated on the color eliminating layer which has been dried:

|  | Parts by weight |
|---|---|
| (a) Dispersing solution (C) | |
| 2-(N—phenyl)amino-6-{N—ethyl-N—(P-tolyl) }aminofluoran | 1.4 |
| Stearic acid amide | 2.0 |
| Hydroxyethyl cellulose | 2.0 |
| Water | 44.6 |
| (b) Dispersing solution (D) | |
| Bisphenol A | 6.6 |
| Oxidized starch | 1.5 |

The heat-sensitive recording sheet colors red at a heating temperature of about 95° C. provided by the thermal head, and colors black at a heating temperature of about 145° C.

The sequence control section 51 controls the output stage of the third video signal processing circuit 63, so that the video signal 64 is applied to the thermal head 17 whenever a predetermined number of pulses are supplied to the step motor 66. The number of pulses depends on a copying magnification selected by the operating panel 25, and the ratio is 75%:100%:125%=3:4:5, whereby the amount of feed of the back roll 18 for every line is controlled.

When the heat-sensitive recording operation has been achieved as described above, the used heat-sensitive recording sheet 15 is delivered to the automatic cutter 22 by the pair of feed rolls 19 and 21, and is then stopped with its end portion protruded as much as a predetermined length toward the sheet discharging tray 23. Under this condition, in response to a control signal from the sequence control section 51, the automatic cutter is driven to cut the heat-sensitive recording sheet 15. The recording sheet 15 thus cut is laid on the sheet discharging tray 23. If a number copies are to be made from one original, the heat-sensitive recording sheets successively laid on the sheet discharging trays 23 are opposite in direction to one another. In other words, the upper portion of the present recording sheet is laid on the lower portion of the preceding recording sheet. Therefore, if it is desired to orient the recording sheets in the same direction on the sheet discharging tray, a mechanism suitable for reversing the direction of a heat-sensitive recording sheet should be provided upstream of the sheet discharging tray 23.

In the above-described copying machine according to the first embodiment of the invention, the platen 1A is fixed. Therefore, with this copying machine, unlike one having a movable platen, the original will never be damaged.

Figure 4:
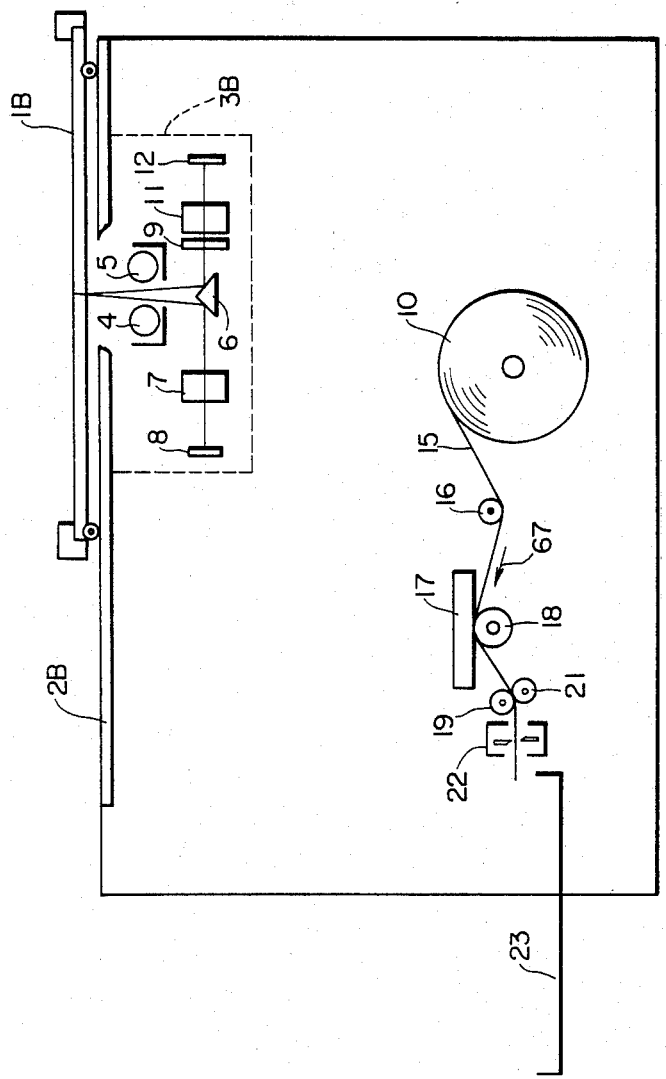
FIG. 4 is an explanatory diagram showing the arrangement of one modification of the copying machine according to the invention.

FIG. 4 shows one modification of the two-color copying machine shown in FIG. 1. In FIG. 4, those components which have been previously described with reference to FIG. 1 are therefore similarly numbered. The two-color copying machine in FIG. 4 is different from that shown in FIG. 1 only in the image reading section for reading image data of an original. Therefore, only the arrangement of the image reading section will be described.

The image reading section comprises a platen unit 1B which is reciprocated on a rail 2B which is mounted on the upper surface of the copying machine body, and a stationary scanner unit 3B which reads a video signal according to a raster scanning system. Rolls 13 and 14 are provided at both end portions of the platen unit 1B which are out of the region where an original is placed, in such a manner that they move on the rail 2B by a platen motor (described later).

The embodiment of FIG. 4 will use the same control circuitry of FIG. 3, with the exception that the switches 53 wil detect the platen position and the motor 55 will drive the platen rather than the scanning unit. When the power switch of the copying machine is turned on, the platen unit 1B is set at its home position in response to the position data which is supplied from platen position switch 53. If the platen unit 1B is not set at the home position within a predetermined period of time, the sequence control section 51 considers this to be an indication of the occurrence of trouble in the copying machine, and the operation of the copying machine is stopped and the trouble indicator 36 (FIG. 2) begins to flicker. If platen position switch 53 detects the platen unit 1B at its home position within the predetermined period of time, the sequence control section 51 controls the motor drive circuit 54 to turn a platen motor 55 in the forward direction or in the reverse direction, to reciprocate the platen unit 1B. If only one copy is to be made from an original, the sequence control section 51 controls the platen motor 55 so that the platen unit 1B returns to the home position quickly. On the other hand, if a number of copies are to be made from an original, the video data are read in both the forward and reverse directions of platen movement similar to the embodiment of FIG. 1.

The two-color copying machine of the invention has been described mainly with reference to its copying operation wherein both the image data reading section and the image data recording section are employed. It goes without saying, however, that video data can be transmitted between the copying machine and external units. Accordingly, if the copying machine is used in combination with an image processing unit which is provided externally, then an image can be composed, or after a part of an image is eliminated or shifted, the part of the image thus processed can be inputted again to form a recorded image. In transmitting a large amount of video data between the copying machine and an external unit, optical communication means with optical fibers is effective.

What is claimed is:

1. A two-color copying machine, comprising:
a platen on which an original document is placed, said original document having an image thereon;
recording signal generation means, including a scanner unit, for reading image data from said original and producing recording signals representing different colors of said image, said scanner unit and platen being mounted for relative movement with respect to one another;
a thermal recording medium which records in a first color when heated to a first temperature range and records in a second color when heated to a second temperature range;
thermal head means responsive to said recording signals for selectively heating portions of said recording medium to temperatures within at least one of said first and second ranges; and
said scanner unit providing output signals representing said image with a resolution of X picture elements per millimeter and said thermal head selectively heating said recording medium at Y locations for every X picture elements, said recording signal generating means including means for varying the value of Y to thereby vary a magnification ratio of said copying machine.

2. A two-color copying machine as claimed in claim 1, wherein said platen is fixedly secured to a body of said copying machine, and said scanner unit is movably mounted.

3. A two-color copying machine as claimed in claim 1, wherein said scanner unit is fixedly secured to a body of said copying machine, and said platen is movably mounted.

4. A two-color copying machine as claimed in claim 1, wherein said recording signal generation means comprises said scanner unit for producing first and second (57, 59) image output signals representing different color portions of said image, and video signal processing means (58, 61, 63) for processing said image signals to obtain said recording signals.

5. A two-color copying machine as claimed in claim 4, wherein said video signal processing means generates a recording signal representing temperatures in said first temperature range in accordance with one of said first and second scanner unit outputs, whereby a reproduced image is in only said first color and corresponds to only that portion of the original image which is of said first color.

6. A two-color copying machine as claimed in claim 4, wherein said video signal processing means combines said first and second scanner unit outputs to obtain at least a first video signal (62) corresponding to a portion of said image of said first color and a second video signal (62) corresponding to a portion of said image of said second color, said video signal processing means providing first and second recording signals in accordance with said first and second video signals.

7. A two-color copying machine as claimed in claim 4, wherein one of said first and second scanner outputs represents two colors of said image, and said video processing means provides a recording signal representing temperatures in only one of said temperature ranges and corresponding to said one scanner output, whereby a single-color image may be reproduced corresponding to said two original image colors.

8. A two-color copying machine as claimed in claim 7, wherein said video signal processing means combines said first and second scanner unit outputs to obtain a first video signal corresponding to a portion of said image having said first color and a second video signal corresponding to a portion of said image having said second color, said video signal processing means providing for each of said first and second video signals a recording signal representing temperatures in only one of said first and second temperature ranges, whereby a single-color recording signal is generated corresponding to said two original image colors.

9. A two-color copying machine as claimed in claim 1, further comprising specifying means for specifying the size of original and control means for setting a distance of relative movement between said scanner unit and platen according to data specified by said specifying means.

10. A two-color copying machine as claimed in claim 4, wherein said scanner unit produces output signals driving both forward and reverse directions of relative movement between said platen and scanner unit, said video processing means rearranging one of said scanner output signals to thereby permit copying operations during both forward and reverse directions of said relative movement.

11. A two-color copying machine as claimed in claim 4, wherein said scanner unit produces output signals representing each line of said image, and said video signal processing means skips the processing of any signals representing a line of said image containing neither of said first or second colors.

12. A two-color copying machine as claimed in claim 1, further comprising signal input and output terminals through which video signals can be transmitted between said copying machine and an external unit.

13. A two-color copying machine as claimed in claim 1, wherein said thermal recording medium is a roll sheet which is supplied from a supply roll.

14. A two-color copying machine as claimed in claim 1, further comprising means for cutting said heat-sensitive recording sheet on which an image has been recorded.

15. A two-color copying machine, comprising:
a platen on which an original document is placed, said original document having an image thereon;
recording signal generation means, including a scanner unit, for reading image data from said original and producing recording signals representing different colors of said image, said scanner unit producing first and second image output signals representing different color portions of said image and said recording signal generation means further including video signal processing means for processing said image signals to obtain said recording signals, said scanner unit and platen being mounted for relative movement with respect to one another;
a thermal recording medium which records in a first color when heated to a first temperature range and records in a second color when heated to a second temperature range;
thermal head means responsive to said recording signals for selectively heating portions of said recording medium to temperatures within at least one of said first and second ranges; and
said video signal processing means generating a recording signal representing temperatures in said first temperature range in accordance with one of said first and second scanner unit output signals, whereby a reproduced image is in only said first color and corresponds only to only that portion of the original image which is of said first color.

16. A two-color copying machine, comprising:
a platen on which an original document is placed, said original document having an image thereon;
recording signal generation means, including a scanner unit, for reading image data from said original and producing recording signals representing different colors of said image, said scanner unit producing first and second image output signals representing different color portions of said image and said recording signal generation means further including video signal processing means for processing said image signals to obtain said recording signals, said scanner unit and platen being mounted for relative movement with respect to one another;
a thermal recording medium which records in a first color when heated to a first temperature range and records in a second color when heated to a second temperature range;
thermal head means responsive to said recording signals for selectively heating portions of said recording medium to temperatures within at least one of said first and second ranges; and
one of said first and second scanner output signals representing two colors of said image, and said video signal processing means providing a recording signal representing temperatures in only one of said temperature ranges and corresponding to said one scanner output, whereby a single-color image may be reproduced corresponding to said two original image colors.

17. A two-color copying machine as claimed in claim 16, wherein said video signal processing means combines said first and second scanner unit outputs to obtain a first video signal corresponding to a portion of said image having said first color and a second video signal corresponding to a portion of said image having said second color, said video signal processing means providing for each of said first and second video signals a recording signal representing temperatures in only one of said first and second temperature ranges, whereby a single-color recording signal is generated corresponding to said two original image colors.

18. A two-color copying machine, comprising:
a platen on which an original document is placed, said original document having an image thereon;
recording signal generation means, including a scanner unit, for reading image data from said original and producing recording signals representing different colors of said image, said scanner unit and platen being mounted for relative movement with respect to one another;
a thermal recording medium which records in a first color when heated to a first temperature range and records in a second color when heated to a second temperature range;
thermal head means responsive to said said recording signals for selectively heating portions of said recording medium to temperatures within at least one of said first and second ranges; and
specifying means for specifying the size of an original and control means for setting a distance of relative movement between said scanner unit and platen according to data specified by said specifying means.

* * * * *